United States Patent [19]

Akagi

[11] Patent Number: 4,561,469

[45] Date of Patent: Dec. 31, 1985

[54] ELECTROMAGNETIC CONTROL VALVE

[75] Inventor: Motonobu Akagi, Kariya, Japan

[73] Assignee: Aisin Seiki Kabushiki Kaisha, Kariya, Japan

[21] Appl. No.: 573,220

[22] Filed: Jan. 23, 1984

[30] Foreign Application Priority Data

Jan. 31, 1983 [JP] Japan .................................. 58-15041

[51] Int. Cl.[4] .............................................. F16K 31/08

[52] U.S. Cl. ................................. 137/625.47; 251/65; 251/129.15

[58] Field of Search ................. 251/65, 133, 134, 129; 137/625.47

[56] References Cited

U.S. PATENT DOCUMENTS

| | | | |
|---|---|---|---|
| 2,872,154 | 2/1959 | Jones | 251/133 |
| 3,028,877 | 4/1962 | Thieme | 137/625.47 X |
| 3,185,179 | 5/1965 | Harantuneian | 137/625.47 |
| 3,202,885 | 8/1965 | Sohns | 137/625.47 X |
| 3,323,548 | 6/1967 | Ludwig | 251/133 X |
| 3,692,041 | 9/1972 | Bondi | 137/625.47 X |
| 4,428,558 | 1/1984 | Odogaki et al. | 251/65 |

*Primary Examiner*—Arnold Rosenthal
*Attorney, Agent, or Firm*—Oblon, Fisher, Spivak, McClelland & Maier

[57] ABSTRACT

An electromagnetic control valve used in an internal combustion engine and which includes a motor having a solenoid coil and a center core, a valve body having an inlet port and outlet ports, a pair of yokes connecting the motor and the valve body, a valve rotor having a shaft, a bushing and a plurality of bores, a rotatable permanent magnet arranged at one end of the valve rotor, a torsion spring arranged at the other end of the valve rotor, and a bearing member for rotatably holding the valve rotor and having openings formed therein.

2 Claims, 2 Drawing Figures

ELECTROMAGNETIC CONTROL VALVE

BACKGROUND OF THE INVENTION

1. Field of the Invention

The present invention relates to an electromagnetic control valve for an internal combustion engine and more particularly to an electromagnetic control valve for controlling the fluid flow rate by rotational movement of the valve member.

2. Description of the Background

In a typical electromagnetic control valve, a motor part for generating an electromagnetic force and a valve assembly for controlling fluid flow rate are installed in one housing. When the valve is actuating a solenoid in the motor usually generates heat (about 350°-360° F.), which will damage the valve members in the valve assembly. Therefore, the member for holding the coil has to be formed by heat-resisting resins or metal materials.

Furthermore a permanent magnet and a valve rotor has to be attached on the same shaft, so that coil of the motor may generate a parallel magnetic field on the permanent magnet. In order to apply such parallel magnetic field under such circumstances, the position of the coil is limited and the effective winding rate of the coil is very low.

Furthermore, the shape of the motor is complex and the cost of the motor becomes higher.

On the other hand, when the coil generates the parallel magnetic field, in the magnetic circuit a great magnetic resistance exists due to a gap between the internal and external yokes.

SUMMARY OF THE INVENTION

It is a principal object of the invention to provide an electromagnetic control valve which prevents heat transmission from the coil of the motor to the valve.

It is another object of the invention to provide an electromagnetic control valve which uses nonheat-resisting resins as a member for holding the coil.

It is a further object of the invention to provide an electromagnetic control valve which uses a proper motor operatively associated with the valve depending on the type of the valve used.

According to the invention, an electromagnetic control valve includes a motor having a solenoid coil wound around the bobbin and a center core inserted into the bobbin, a valve body having an inlet port and outlet ports, a pair of yokes for connecting the motor and the valve body, a valve rotor having a bush and bores, a rotatable permanent arranged in one end of the valve rotor, a torsion spring for providing a biasing force in one direction and arranged in the other end of the valve rotor and a bearing member for rotatably holding the valve rotor and having openings formed therein.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENT

Description will be hereinafter made regarding a preferred embodiment of the electromagnetic control valve according to the present invention.

Figure 1:
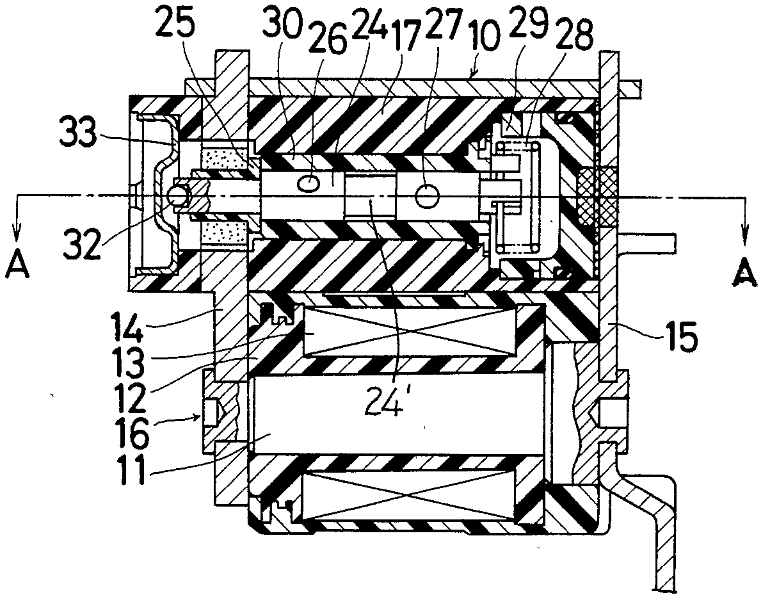
FIG. 1 is a sectional view of an electromagnetic control valve of the present invention.

Referring to an electromagnetic control valve 10 shown in FIG. 1, a center core 11 formed out of magnetic substance is fitted into a bobbin 12 formed out of resins.

A solenoid coil 13 connected to the power source is wound around the bobbin 12.

The motor 16 is comprised of the core 11 and the coil 13, and the bobbin 12 is connected to a pair of yokes 14 and 15 formed of a magnetic substance and, moreover, the yokes 14 and 15 are connected to a valve body 17. A magnetic circuit is composed of a pair of yokes 14 and 15, the core 11 and the coil 13.

Figure 2:
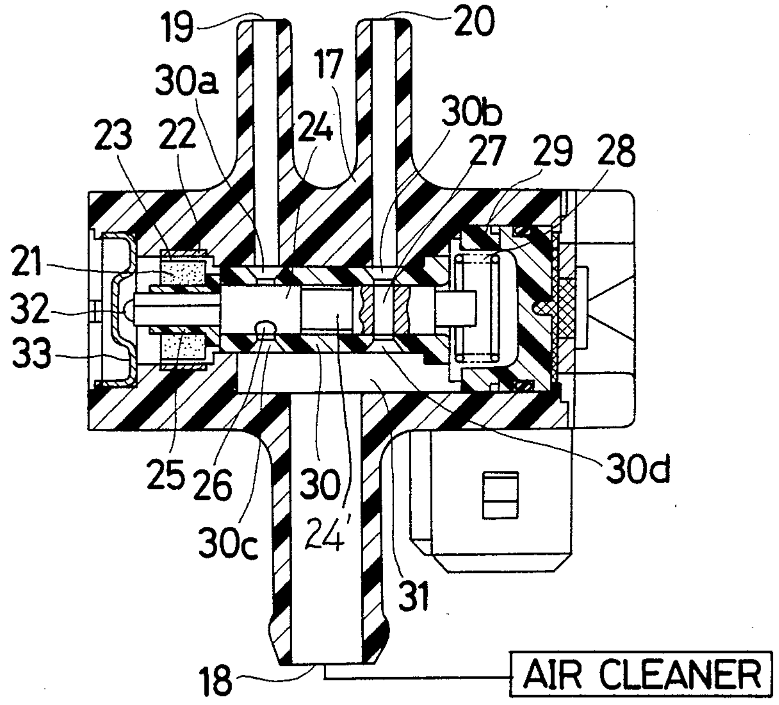
FIG. 2 is a sectional view taken along line A—A of FIG. 1.

As shown in FIG. 2, the valve body 17 has an inlet port 18 and outlet ports 19 and 20. The inlet port 18 is connected to an air cleaner of an engine, and is given a supply of air. On the other hand the outlet port 19 is connected to a main port in a fuel injection system of the engine, the outlet port 20 is connected to another port in that system.

A permanent magnet 21 is arranged in the valve body 17, and is rotatably disposed in the magnetic circuit formed by the motor 16. A clearance 23 is formed between the permanent magnet 21 and a metal ring 22 is pressed into the valve body 17. A permanent magnet 21 is fixedly mounted on a bush 25 attached to one end of a shaft portion 24' of a valve rotor 24, and will rotate with the valve rotor 24. Two bores 26 and 27 are formed in the valve rotor shaft 24'.

A coil spring 28, providing a biasing force in one direction, is arranged in the other end of the valve rotor 24. A biasing force of the spring 28 is changeable by means of an adjuster 29 within a certain range. A bearing member 30 is closely inserted into the valve body 17, and holds the valve rotor 24 so as to be freely rotatable.

Openings **30*a* and 30*b*, which are respectively communicable with outlet ports 19 and 20, are formed in the bearing member 30. Furthermore openings 30*c* and 30*d* which are communicable with an air chamber 31 are formed in the valve body 17, and the air chamber 31 is in communication with the inlet port 18. The valve mechanism includes the bearing member 30 and the valve rotor 24**.

A steel ball 32 is inserted into one end of the valve rotor 24 in order to secure the permanent magnet 21 and the bushing 25 on the valve rotor 24. A metal cover 33 is pressed into the valve body 17, the metal cover 33 operates as a seal or a stopper member of the valve rotor 24 moving in the axial direction.

OPERATION OF VALVE

When electrical signals are transferred to the solenoid coil 13 and the solenoid coil 13 receives the supply of electric current, a magnetic circuit is formed by the solenoid coil 13, the center core 11 and a pair of external yokes 14 and 15.

The magnetic circuit produces torque to the permanent magnet 21. In response to the rotation of the permanent magnet 21 the valve rotor 24 rotates against the biasing force of the spring 28.

If the valve rotor 24 is located in the position shown in FIG. 2, both ends of the bore 27 will be in respective communication with the openings 30*b* and 30*d* of the bearing member 30, therefore the inlet port 18 is via bore 27 in communication with the outlet port 20, and air is transferred from the inlet port 18 to the outlet port 20. On the other hand the bore 26 of the valve rotor 24 is isolated from the openings 30*a* and 30*c* of the bearing member 30 and the inlet port 18 is not in communication with the outlet port 19.

Accordingly in response to the rotation of the valve rotor 24, the inlet port 18 is communicable with the outlet port 19 and/or the outlet port 20.

The rate of communication between the inlet port 18 and the outlet ports 19 and 20 is controlled by the valve rotor 24. A phase difference between the bore 26 and the bore 27 is determined properly according to the purposes for which the valve are used.

Obviously, numerous modifications and variations of the present invention are possible in light of the above teachings. It is therefore to be understood that within the scope of the appended claims the invention may be practiced otherwise than as specifically described therein.

What is claimed is:

1. An electromagnetic control valve, comprising:

a motor having a solenoid coil wound around a bobbin and a center core formed of magnetic substance and inserted into said bobbin;

a valve body having an inlet port and an outlet port;

a pair of yokes formed of magnetic substance and interconnecting said motor and said valve body;

a valve rotor having a shaft which includes a plurality of bores formed therein communicable with said inlet port and said outlet port;

a rotatable permanent magnet arranged at one end of said valve rotor and disposed in one of said yokes;

a coil spring for biasing said valve rotor in one direction and arranged at an end of said valve rotor opposite said one end of said valve rotor; and a bearing member inserted into said valve body for rotatably holding said valve rotor and having a plurality of openings respectively communicable with said plurality of bores.

2. An electromagnetic control valve according to claim 1, further comprising means for adjusting a biasing force of said coil spring.

* * * * *